April 4, 1944. D. L. BABCOCK 2,345,999
CONTROL DEVICE FOR PHOTOGRAPHIC CAMERAS
Filed Oct. 28, 1941 2 Sheets-Sheet 1
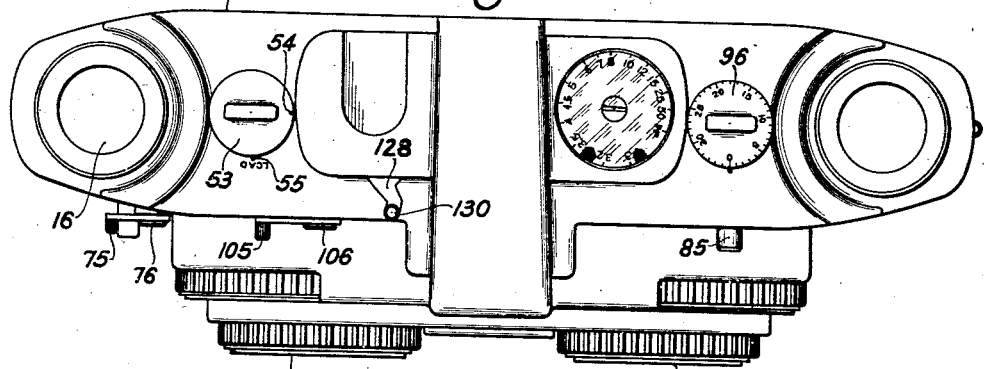
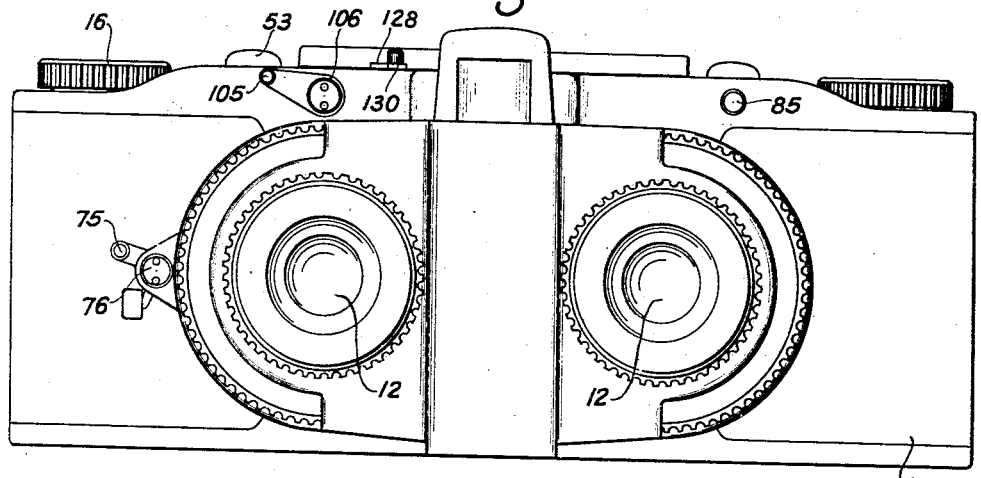
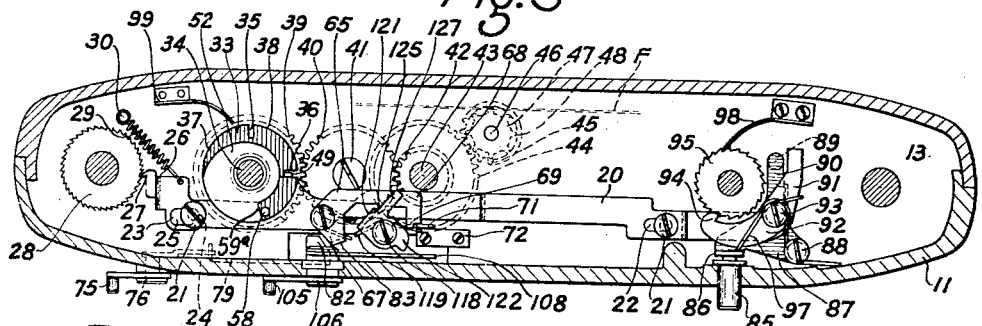
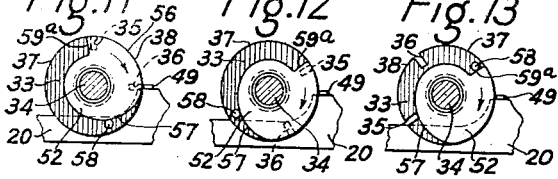
David L. Babcock
INVENTOR
ATTORNEYS April 4, 1944.  D. L. BABCOCK  2,345,999
CONTROL DEVICE FOR PHOTOGRAPHIC CAMERAS
Filed Oct. 28, 1941  2 Sheets-Sheet 2
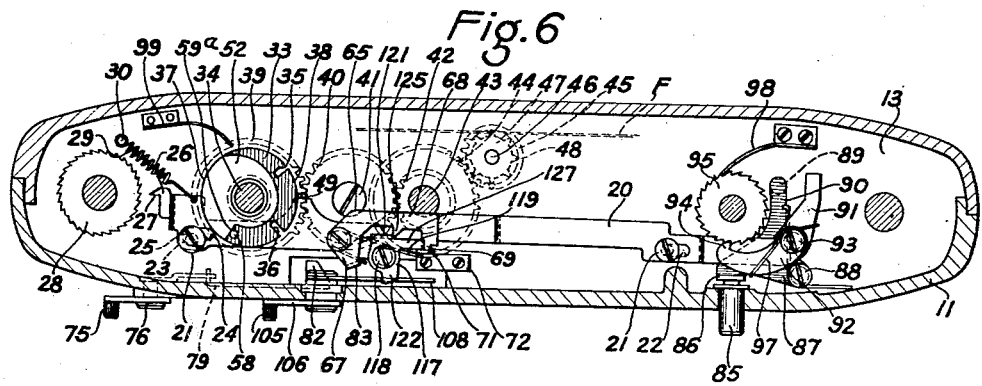
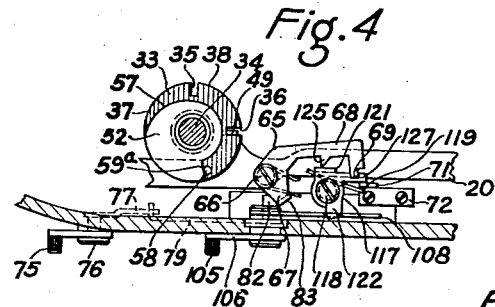
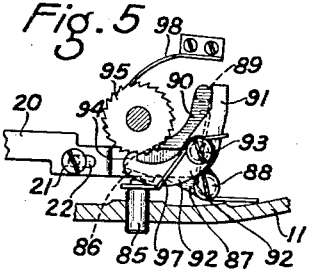
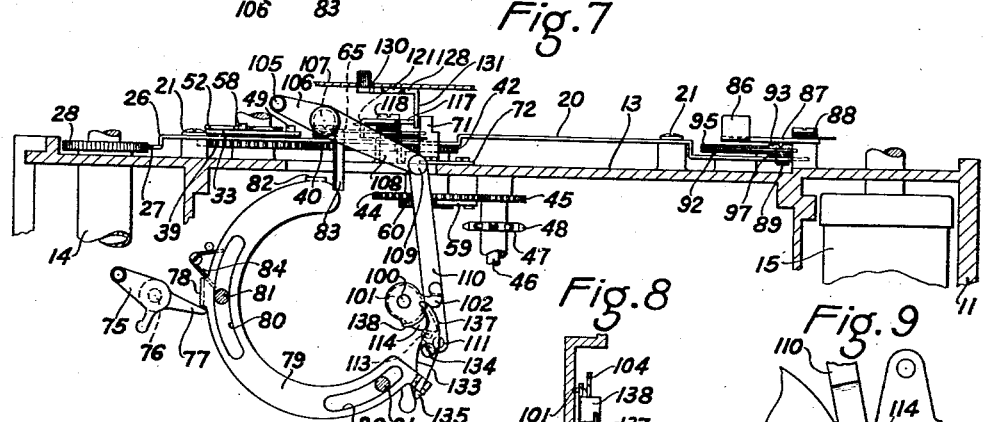
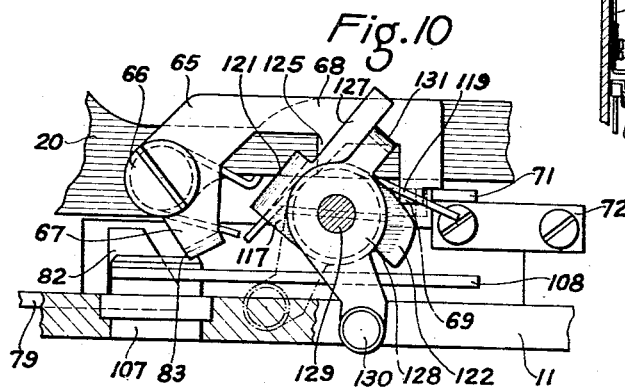
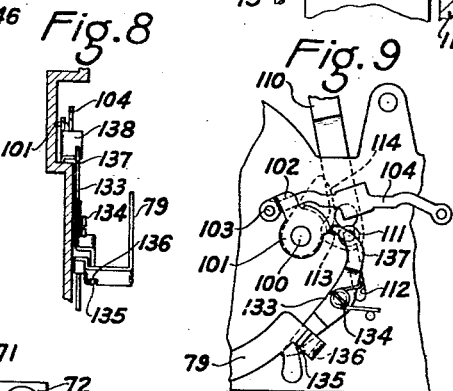
David L. Babcock
INVENTOR
BY
ATTORNEYS Patented Apr. 4, 1944

2,345,999

UNITED STATES PATENT OFFICE 2,345,999

CONTROL DEVICE FOR PHOTOGRAPHIC CAMERAS

David L. Babcock, Rochester, N. Y., assignor to Eastman Kodak Company, Rochester, N. Y., a corporation of New Jersey Application October 28, 1941, Serial No. 416,823

20 Claims. (Cl. 95—31)

The present invention relates to photographic roll film cameras, and more particularly to cameras of the class which are adapted to take pairs of stereo pictures.

It is old in cameras of this class to provide a film measuring means which is actuated by the movement of the film strip across the camera body, and which automatically controls a locking device which is movable into engagement with the film winding mechanism after a predetermined length of film has been wound. After the exposure is made, the locking device is moved to an inoperative position to free the winding mechanism so that the latter may now be rendered effective to wind up the two exposed image areas of the film strip.

The present invention has as one of its objects the provision of an arrangement for rendering the film locking device inoperative during the wind up of the leader portion of the film strip.

A further object of the invention is the provision of an arrangement for initially adjusting the control member for the locking device to a predetermined initial position.

Another object of the invention is the provision of an arrangement for positively holding the locking means in locking relation with the film winding means.

A still further object of the invention is the provision of an arrangement by which the actuation of the shutter release mechanism serves to move the holding means out of holding position to permit the release of the locking means.

Yet another object of the invention is the provision of an arrangement whereby the shutter setting lever or member cannot be actuated a second time prior to the making of the exposures, and the winding up of exposed image areas.

Yet another object of the invention is the provision of an interlock between the shutter setting and the shutter actuating mechanisms by which the latter is locked against movement until the setting mechanism has first been operated to set the shutter.

To these and other ends, the invention resides in certain improvements and combinations of parts, all as will be herein more fully described, the novel features being pointed out in the claims at the end of the specification.

In the drawings:

Fig. 1 is a top plan view of a stereo camera constructed in accordance with the present invention;

Fig. 2 is a front view of the camera illustrated in Fig. 1;

Fig. 3 is a top view of a portion of the camera illustrated in Fig. 1, but with the top plate removed, and showing the various mechanisms, and the arrangement of the parts at the end of the film winding operation;

Fig. 4 is a plan view of a portion of the mechanism illustrated in Fig. 3 showing the relation of the parts at the completion of the shutter actuation;

Fig. 5 is a plan view of another portion of the mechanism illustrated in Fig. 3, but showing the mechanism for moving the locking mechanism out of locking relation with the film winding mechanism, and the structure for operating the exposure counter;

Fig. 6 is a view similar to Fig. 3, but showing the relation of the parts during the film winding operation and just prior to the locking of the winding mechanism.

Fig. 7 is a vertical sectional view through the camera with parts omitted for purpose of clarity, showing the interconnecting locking latch between the shutter setting and the shutter actuating mechanisms, and the position of the parts prior to the operation of the setting mechanism;

Fig. 8 is a partial view of the mechanism illustrated in Fig. 7, showing the relation of the shutter setting and actuating mechanisms, and the interconnecting locking mechanism therebetween;

Fig. 9 is a fragmentary view of the mechanism illustrated in Fig. 7, but on a larger scale than the latter, showing the relation of the parts when the shutter setting mechanism has been operated to set the shutter and to move the locking latch out of locking engagement with the shutter trip bar to release the shutter actuating mechanism;

Fig. 10 is a plan view of a portion of the mechanism illustrated in Figs. 3 and 6, but on a larger scale than these figures, showing the relation thereto of a throw-out lever which temporarily renders some of the locking devices inoperative to permit the making of an intentional double exposure.

Fig. 11 is a fragmentary plan view of a portion of the mechanism shown in Figs. 3 and 6, showing the relation of the film measuring cam and the initial adjusting cam therefor prior to the winding of the leader strip onto the take-up spool;

Fig. 12 is a view similar to Fig. 11 showing the relation of the parts during the winding up of the leader strip onto the wind-up spool; and Fig. 13 is a view similar to Figs. 11 and 12 showing a further relation of the two cams during the winding up of the leader strip and showing the methods of connecting the film measuring cam to the initial adjustment cam.

Similar reference numerals throughout the various views indicate the same parts.

The present invention relates to a film measuring and control device for use with a stereo camera provided with shutters of the setting type in which one trigger sets or tensions both shutters, and a second trigger operates or releases the set or tensioned shutters to make the stereo exposures. Such a camera comprises, in general, a body having a film casing or compartment in one end of which is positioned a supply spool or retort containing the unexposed film strip. The take-up spool is preferably positioned in the opposite end of the film casing, and is adapted to be rotated to wind up the exposed film areas thereon, and to bring simultaneously two unexposed pictures or film areas into exposing position, as is well known. When the film has been moved the proper distance to bring the new unexposed picture frames or areas into exposing position, the take-up spool is automatically locked against further rotation or actuation.

The locking means has mounted thereon a movable holding member which is arranged to drop behind a holding shoulder on the camera body upon engagement of the locking means with the winding means to hold positively the locking means in engaging relation. As the locking means moves into position to engage the winding means to lock the latter, a tooth on the holding member engages and rocks a blocking member or setting lever lock to move the latter out of the path of the shutter setting lever so that the latter may be moved to set the shutter. The shutter setting lever is then actuated to operate the setting mechanism to tension or set the shutter. Such operation automatically moves a locking latch out of locking engagement with the shutter actuating or trip mechanism which may now be actuated to make the exposures. At the completion of the exposure operation, a lug on the shutter trip bar engages the holding member to move the latter away from the shoulder and out of engaged relation with the blocking member. The latter being free, now moves into position to block the setting lever to prevent a second actuation thereof prior to winding the film strip. Such movement of the blocking member supports the holding member out of engagement with the shoulder. The locking means may then be shifted out of locking engagement with the winding means to free the latter so that it may be rotated to wind up the exposed image area.

The above-described mechanism effectively prevents the making of a double exposure or the inadvertent winding up of an exposed portion of the film strip. If desired, a deliberate double exposure may be made. To secure this result, an auxiliary lever is provided for moving the locking lever or setting lever lock out of the path of the setting lever so that the latter may be actuated to tension the shutter so that the latter may be operated a second time prior to the winding of the film strip. After the second actuation of the shutter, the parts are returned to normal position to prevent the inadvertent or unintentional making of a double exposure.

In stereo cameras for hand use, it is customary to supply a lens separation and a picture- frame separation equal to the normal observer's interocular distance. If standard 35-mm. motion-picture film is used in such a camera, it has been found that the frame size corresponding to the minimum waste and maximum frame size is seven perforation holes long. In order to use this desirable size, however, it is necessary to arrange a pair of picture frames in such a manner that after the first exposure, the frame is moved one frame only to bring the second pair of picture frames into position. After the second exposure, however, the film is moved a distance of three frames to bring the third pair of picture frames into exposing position. This alternate movement of first one frame and then three frames is continued for each alternate pair of picture frames throughout the entire film strip.

In order to secure this one frame, three-frame sequence, the film strip has the pairs of image areas arranged in a manner shown and described in the patent to Young, No. 2,090,017, to which reference may be had. As such film arrangement does not constitute a part of the present invention, a showing thereof in this application is not deemed essential.

The present invention is embodied, in the present instance by way of illustration only, in a stereo camera having a body portion or casing 11 on the front of which a pair of suitably spaced objective lens mounts 12 are arranged. The body 11 is formed with a partition 13 extending the full length thereof and dividing the interior of the camera into a small mechanism compartment, hereinafter described, and a large compartment which houses the take-up spool 14, and a supply film retort 15 in which a strip of unexposed sensitized film, not shown, is wound. The film is guided from the retort 15 to the take-up spool 14 over film guides, not shown, having a pair of spaced apertures, not shown, arranged in alignment with the two lenses 12, as is well known, whereby two picture frames may be exposed at one time. This specific camera construction is shown and described in the above-mentioned patent to Young, No. 2,090,017, and to which reference may be had. As these specific features of such a camera are not part of the present invention, a detailed showing thereof is not deemed necessary. A suitable knob 16 is provided for rotating the take-up spool 14 to wind the exposed film thereon, as will be readily apparent to those in the art.

In order to bring successive pairs of picture frames into proper exposing position, the film strip is alternately moved one and then three picture frames, as pointed out above, by turning the knob 16 which is operatively connected to the spool 14. This winding cycle is preferably accomplished automatically, thus entirely relieving the user of the camera of the necessity of properly registering the film for exposure. To this end, means is provided to automatically stop or arrest movement of the film strip when the latter has been moved a predetermined distance to properly position a pair of image areas in exposing position.

This arresting means is in the form of a lever 20, of the shape best shown in Figs. 3 and 6, which is mounted on the partition 13 by a pair of studs 21, one of which extends through a straight, elongated slot 22 formed in the lever 20. The other stud 21 extends through a second slot 23 in the lever 20, this second slot being formed with a small portion 24 and an enlarged portion 25, the purpose of which will be later more fully described. By means of this arrangement, the lever 20 is both pivotally and slidably mounted on the partition 13. The left end 26 of the lever 20 is formed to provide a pawl 27 adapted to be moved into engagement with a ratchet 28 connected to and rotatable with the wind-up spool or spindle 14. When the pawl 27 is in engagement with the ratchet 28, as shown in Fig. 3, the take-up spool 14 is locked against rotation. When, however, the pawl 27 is moved out of engagement with the ratchet 28, as shown in Fig. 6, the spool 14 is free and may be rotated to wind up the exposed picture or image areas thereon, as will be readily apparent to those in the art. A spring 29 has one end anchored to a stud 30 formed on the partition 13, and the other end secured to the lever 20, and tends to pull the lever 20 to the left toward the ratchet 28 and to also pivot the lever in a manner and for a purpose to be later described.

A control disk or film spacing cam 33 is rotatably mounted on a stud 34 suitably secured to the partition 13, and is provided with two radially extending notches or open-end slots 35 and 36. These slots are so positioned that the greater distance 37 therebetween is three times the lesser distance 38, as is apparent from an inspection of the drawings. The cam 33 is rotated, by mechanism to be later described, at such a rate relative to the film movement that the lesser distance 38 corresponds to a movement of one picture frame of the film, and the larger distance 37 corresponds to the movement of three picture frames.

The lower face of the cam 33 is formed with a gear 39 which meshes with a gear 40 mounted on a shaft 41. The gear 40 in turn, meshes with a gear 42 carried by a shaft 43 which also carries a loosely mounted gear 44 connected to rotate, through a clutch, with the gear 42. The gear 44 finally meshes with a gear 45 carried by the film measuring roll shaft 46 which is journaled in the partition 13. This shaft 46 extends across the large compartment in front of the film, and has one end journaled in the partition 13 and the opposite end journaled in the opposite side of the camera, not shown.

A sprocket 47 having a plurality of teeth 48, in the present instance seven, is mounted on the shaft 46 adjacent the partition 13 in such a manner that the teeth 48 will engage marginal perforations, not shown, formed in the film strip F, in a manner well known in the art. By means of this arrangement, rotation of the sprocket 47 will be in definite timed relation to the movement of the film strip across the camera body. As the various gears 39, 40, 42, 44, and 45 operatively connect the sprocket 47 with the cam 33, it is evident that the latter will also rotate in timed relation to the movement of the film strip. The gears are so proportioned that a movement of four picture frames will cause one complete revolution of the cam 33.

When the first pair of image areas are moved into proper exposing position, the slot 36 of the cam 33 is now moved, by mechanism to be later described, into registry with an upturned lug 49 formed on the lever 20. When this position is reached, the lug 49 will automatically move into the notch 36 under the action of the spring 29, to shift the lever 20 to the left, as viewed in Fig. 3, to bring the pawl 27 into locking engagement with the ratchet 28 to arrest further rotation of the take-up spool 14. After the first exposure is made, the lever 20 is shifted to the right, in a manner to be later described, to disengage the pawl 27 from the ratchet 28 to free the take-up spool 14. The latter is now rotated by rotating the knob 16 to wind up the first two exposed picture areas and to simultaneously bring the second two picture areas into exposing position. As this change requires a film movement only equal to the length of one picture frame, as pointed out above, the cam 33 is rotated one-quarter of a revolution, which represents the lesser distance 38, to bring the notch 35 into registry with the lug 49, whereupon the latter moves into the notch 35 to again bring the pawl 27 into locking engagement with the ratchet 28 to stop further film winding.

When, however, the second pair of picture frames have been exposed, it is necessary to move the film strip a distance equal to the length of three picture frames which will thus rotate the cam 33 the greater distance 37 between the notches 35 and 36. The specific arrangement of the image areas on the strip are clearly shown in the above-mentioned patent to Young to which reference may be had. When the cam 33 has thus been rotated the notch 36, is again brought into registry with the lug 49 so that the latter will now move into the notch 36, causing the pawl 27 to again move into locking engagement with the ratchet 28 to prevent further rotation of the take-up spool 14. It is now apparent that the various pairs of picture frames may be moved into exposing position; and, when properly positioned, the movement of the film is then automatically arrested. Such an arrangement thus, not only insures proper registration of the picture frames, but also relieves the camera user of the necessity of properly registering the picture frames for exposure.

The above-described mechanism is automatically effective after the first image areas are moved into exposing position. As is well known, however, film strips are provided with a leader section or portion which is manually secured, in a well-known manner, to the take-up spool. This leader strip is then wound up on the take-up spool so as to bring the first image areas into exposing position, as is well known in the art. During this initial winding up of the leader portion of the film strip, it is desirable to render the film locking means 27 and 28 and the film measuring cam 33 inoperative so as to prevent the locking of the take-up spool during this initial winding operation, the advantages of which will be apparent.

To secure this result, a presetting or initially-adjusting cam 52 is loosely mounted on the stud 34 so that it may be rotated thereon relative to the film spacing cam 33. A knob 53 is mounted on the outside of the camera casing 11, and is operatively connected with the cam 52 to rotate the latter. After the camera is loaded in the usual and well-known manner, the knob 53 is given one full turn and then a portion of a turn to bring an indicating mark or dot 54 thereon into registry with a stationary mark or dot 55, designated as "load," formed on the camera body 11. Such a rotation of the cam 52 first moves the latter to a position shown in Fig. 11, in which an arcuate portion 56 overlies and blocks the slots 35 and 36 of the cam 33. The portion 56 is of a slightly larger diameter than the cam 33 and thus engages and supports the lug 49 to prevent the latter from entering the slots 35 and 36 to actuate the film locking means to lock the winding mechanism. At the same time, an eccentric surface 57 of the cam 52 comes into engagement with an upstanding pin 58 on the cam 33, as shown in Fig. 11. The knob 53 is further rotated, and when the indicating dots 54 and 55 are finally brought into registry, the cam 52 has moved the cam 33 to an initial position of adjustment, as shown in Fig. 12. It will be apparent from this figure that the lug 49 cannot enter the slots 35 and 36, so that the locking mechanism will be rendered ineffective.

Now as the take-up spool 14 is rotated, the film strip is moved across the camera body, and serves to rotate the sprocket 47. Such rotation, through the gears 45, 44, 42, 40 and 39, rotates the cam 33 in a clockwise direction. During this rotation of the cam 33, the lug 49 frictionally engages the edge of the portion 56 of the cam 52 to hold the latter stationary. Continued movement of the film strip serves to rotate the cam 33 until the pin 58 thereon finally engages a radial shoulder 59a formed on the cam 52, as shown in Fig. 13, at which time both of the slots 35 and 36 have been moved out from under the portion 56 of the cam 52. Now the final winding up of the leader strip continues to rotate the cam 33, and through the pin and shoulder connection 58 and 59, rotates the cam 52 as a unit therewith until the slot 36 is moved into registry with the lug 49, whereupon the latter moves into the slot 36 to lock the film winding mechanism, as above described.

The parts are so designed and proportioned that the locking of the film winding mechanism occurs when the first two picture areas have been moved into exposing position behind the lens mount 12. The cam 52, however, provides an arrangement which renders the film locking means inoperative and ineffective during the winding up of the leader portion of the film strip. Furthermore, the cam 52 serves to move the film measuring cam 33 to an initial position of adjustment so that when the first two image areas are moved into proper position, the slot 36 will have been brought into registry with the lug 49 to permit the locking of the film mechanism to arrest further rotation thereof.

As mentioned above, the cam 33 is operatively connected to the film engaging mechanism or sprocket 47 through the gears 39, 40, 42, 44, and 45. During the initial setting of the cam 33, it is desirable, however, to move the cam 33 relative to the sprocket 47, and hence the film strip, so that the cam 33 will be in a proper initial position relative to the first two picture areas on the film strip.

In order to secure such relative movement between the cam 33 and the sprocket 47, a suitable clutch is provided therebetween so that the cam 33 may be disconnected from the sprocket 47 during such initial adjustment. Such a clutch may be of any standard or suitable construction. In the present embodiment, however, the clutch comprises, a pawl 59 carried by the under side of the gear 44, and adapted to engage a ratchet 60 secured to the lower end of the shaft 43, as best shown in Fig. 7. During the normal operation, the rotation of the gear 45 on the shaft 46 serve to rotate the gear 44, and, through the pawl and ratchet 59 and 60, rotate the shaft 43, gear 42, gears 40 and 39 and finally cam 33. The initial adjustment of the latter serves to turn the ratchet 60 relative to the pawl 59 and thus disconnect the cam 33 from the sprocket 47.

As the lever 20 is moved to the left to bring the pawl 27 into locking engagement with the ratchet 28, means are preferably provided for positively holding or locking the lever in this position so as to prevent the accidental or unintentional disengagement of the pawl and ratchet 27 and 28. This holding means comprises, in the present embodiment, a bellcrank 65 pivotally mounted on a stud 66 carried by the lever 20. This bellcrank 65 is thus secured to and moves as a unit with the lever 20 and may, therefore, be broadly considered as a part thereof. The bellcrank 65 is formed with a short arm 67 and a longer arm 68. The latter is so arranged that when the lever 20 is moved to the left to bring the pawl 27 into locking engagement with the ratchet 28, a lug 69 on the arm 68 drops down behind a shoulder 71 formed on a bracket 72 suitably secured to the partition 13. The engagement of the lug 69 behind the shoulder 71 serves to hold positively the lever 20 to retain the pawl 27 in locking engagement with the ratchet 28. However, when the lever 20 is to be moved to the right to disengage the pawl 27, as will be later described, the bellcrank lever 65 is first rotated in a counter-clockwise direction about its pivot 66, in a manner to be later described to disengage the lug 69 from the shoulder 71 to free the lever 20. As the lever 20 is then moved to the right, the lug 69 rides along the upper surface of the shoulder 71, as shown in Fig. 6. The bellcrank 65 thus provides an arrangement for holding positively the locking mechanism 27 and 28 in locking relation with the film winding mechanism, to hold the latter against rotation.

Each of the lens mounts 12 is provided with a shutter mechanism which is actuated during the exposure so that two stereo images are simultaneously made, as is well known. Furthermore, the two shutter mechanisms are interconnected so that they may be operated by a single shutter release or actuating trigger 75. As the particular shutter designs and the interconnecting members therefor constitute no part of the present invention, a detailed showing thereof is not deemed necessary.

The shutter trigger 75 is pivoted at 76 on the casing 11 and has a portion 77 adapted to engage an upturned gear or lug 78 formed from the shutter trip bar 79 of the left-hand shutter mechanism. This trip bar is shown as it is utilized in releasing the bell crank 65, in a manner to be later described. The trip bar 79 of each shutter, only one of which is shown, is arcuate in shape and formed with arcuate slots 80 adapted to receive pins 81 secured to the front wall of the camera casing 11 to mount the trip bar 79 thereon. As is well known, the pressing of the trigger 75 will move the trip bar 79 in a clockwise direction to actuate both of the shutters to make the exposures. This movement of the left trip bar 79 brings a lug 82 thereon into engagement with a lug or ear 83 formed on the end of the short arm 67 of the bellcrank 65 to rock the latter in a counter-clockwise direction to disengage the lug 69 from the shoulder 71 to release the holding means for the lever 20. Upon releasing the trigger 75, a hairpin spring 84, of well-known construction, serves to return the trigger 75 and the trip bar 79, as well as the other shutter parts, to an inoperative position, shown in Fig. 7. Such a return movement, moves the lug 82 out of engagement with the ear or lug 83, but means, to be later described, then serves to support the bellcrank 65 to retain the lug 69 of the arm 68 out of holding relation with the shoulder 71. The lever 20 may now be moved to the right by mechanism to be later described, to disengage the pawl 27 from the ratchet 28 to free the winding mechanism and the spool 14 so that the latter may be again rotated to wind up the exposed picture frames.

The lever 20 may be moved or slid to the right in any suitable manner. Such moving or shifting means comprises, in the present embodiment, a push button 85 mounted to move through an opening in the casing 11 and into engagement with an arm 86 of a bellcrank 87 pivoted at 88 on the partition 13. Upon pressing the button 85, the bellcrank 87 is first moved in a clockwise direction about its pivot to bring the pin 89 formed on the other arm 90 thereof into engagement with an offset extension 91 of the lever 20. Further pressure on the button 85 then causes a further rocking of the bellcrank 87 which, through the pin 89, moves the lever 20 to the right to disengage the pawl 27 from the ratchet 28 to free the film winding mechanism, as shown in Fig. 6. The right end of the lever 20 has pivoted thereon, at 93, a pawl 92 the nose 94 of which is arranged to engage a counter ratchet 95 operatively connected to the counter dial 96. A spring 97 is wrapped around the pivot 93 and has one end connected to the pawl 92 to retain the nose 94 thereof in engagement with the counter ratchet 95. Now when the lever 20 is moved to the right, by pressing the button 85, the pawl 92 moves as a unit therewith. Such rightward movement causes the nose 94 to rotate the ratchet 95 one tooth to register the exposure on the counter dial 96. A spring 98, secured to the partition 13, engages the ratchet 95 to prevent reverse movement thereof when the lever 20 and pawl 92 are moved to the left to lock the film winding mechanism, as above described.

As the lever 20 is moved to the right, the lug 49 is drawn out of the registering slot 35 or 36 in the film measuring cam 33. Such movement also moves the left stud 21 out of the small portion 24 of the slot 23 to position this left stud 21 in the large portion 25, as shown in Fig. 6. The spring 29 then serves to pivot the lever 20 in a clockwise direction about the right stud 21 to move the lug 49 out of registry with the slot 35 or 36 and onto the periphery of the cam 33, as shown in Fig. 6. Such movement of the lever 20 may tend to cause the lug 49 to rotate the cam 33 in a counter-clockwise direction, the disadvantages of which are apparent. To remove any such tendency, a spring 99 is mounted on the partition 13 and engages the gear 39, as shown in Figs. 3 and 6. As the winding mechanism is now free, the spool 14 may be rotated to wind up the exposed film areas and also rotate the cam 33. During the film winding, the lug 49 rides along the periphery of the cam 33, see Fig. 6, until the next slot 35 or 36 is brought into registry with the lug 49, whereupon the latter then moves to the left and into the registering slot under the action of the spring 29. Such leftward movement slides the lever 20 to again bring the pawl 27 into engagement with the ratchet 28 to prevent further rotation of the film winding mechanism. During this leftward movement of the lever 20, the lug 69 on the arm 68 of the bellcrank 65 rides along the shoulder 71 and finally drops down behind the shoulder substantially simultaneous with the engagement of the pawl 27 with the ratchet 28 to hold the lever 20 in the locking position.

The camera construction of the present invention utilizes shutters of the setting type in which a setting lever must first be operated to set or tension the shutter before the trigger 75 may be actuated to trip the shutter to make the exposure. To this end, each shutter is provided with a shutter setting shaft 100 which is connected in a suitable and well-known manner to the shutter setting mechanism so that the partial rocking or rotation of the shaft 100 in a counter-clockwise direction serves to set or tension the shutter in a manner well known to those in the art. The setting shaft 100 of the left-hand shutter has mounted thereon a disk 101 formed with a radially extending arm 102 which has pivotally connected thereto at 103 a connecting link 104 which is likewise connected to a similar disk, not shown, and the other shutter setting shaft, also not shown, so that the rotation of the left shutter setting shaft 100 will, through the disk 101 and the link 104, simultaneously set or tension the right-hand shutter. Thus both shutters may be simultaneously set or tensioned by the partial rotation of the setting shaft 100 of the left-hand shutter, as shown in Fig. 7.

The shutters may be set by pressing on the knob or shutter setting trigger 105 mounted on a crank or arm 106 connected to a rock shaft 107 carried by the casing 11. A second crank or lever 108 has one end connected to the shaft 107 while the other end has pivoted thereon at 109 a connecting rod 110. The lower end of the latter carries a pin 111 which moves in a slot 112 formed in the camera casing to guide the rod 110. It will now be apparent that the pressing of the trigger 105 will rock the lever 108 in a counter-clockwise direction to move the rod 110 upwardly. This upward movement of the rod 110 serves to bring a second pin 113 thereon into engagement with a cam 114 carried by the setting shaft 100 to rock the latter in a counter-clockwise direction to set both shutters. Thus the pressing of the trigger 105 serves to rock the setting shaft 100 of the left shutter to simultaneously set or tension both shutters. After the shutters are thus set, the pressing of the shutter trigger 75 simultaneously releases both shutters to expose two image areas of the film strip to provide the desired stereo images.

As is well known in the art, it is very desirable to provide means to prevent the making of a double exposure on any pair of image areas. It is also known that a second actuation of the trigger 75 will not make the second exposure until the setting trigger 105 has first been actuated a second time to tension the shutter. Thus, after the shutters have been tripped, they must be again tensioned before another exposure can be made. The present invention, therefore, provides a blocking member which automatically moves into the path of the setting lever after the shutter trigger has been actuated to lock the setting trigger against a second actuation until the film strip has been moved. The winding of the film strip then serves to move the blocking member to an inoperative position to free the setting trigger so that it may now be operated.

This locking means of the present invention comprises a setting lever lock or blocking member 117, of the shape shown in Figs. 3, 4, and 6, mounted for rocking movement on a stud 118 carried by the partition 13. A spring 119 is wrapped around the stud 118 and has one end in engagement with the shoulder 71 and the other end in engagement with an upturned lug or ear 121 formed on the blocking member 117. The spring 119 tends to rotate or rock the member 117 in a clockwise direction to move a radially projecting portion 122 thereof into the path of the lever 108, as shown in Fig. 6. It is apparent from this figure that the portion 122 blocks the upward movement of the lever 108, and thus effectively prevents the actuation of the setting trigger 105 to set the shutters.

In order that the locking member 117 may be moved to its blocking position so as to effectively prevent a second actuation of the shutter setting lever 105 before the exposed picture areas have been wound, the present invention provides an arrangement whereby the movement of the blocking member 117 into blocking position is controlled from the operation of the shutter tripping mechanism. To secure this result, the bellcrank 65, which, is carried to the left by the lever 20 during the film locking operation, as mentioned above, is formed with a tooth 125 which is adapted to engage the ear 121 to rotate or rock the blocking member 117 in a counter-clockwise direction about the stud 118 to move the portion 122 out of the path of the lever 108, as shown in Fig. 3, which represents the position of the parts at the completion of the film winding operation. The lever 108 is now free and the setting trigger 105 may be pressed to tension both shutters.

Now when the shutter trigger 75 is released, the shutter trip bar 79 is moved to the right to bring the lug 82 thereof into engagement with the lug 83 of the arm 67 of the bellcrank lever 65 to rock the latter in a counterclockwise direction to the position shown in Fig. 6. Such rotation of the bellcrank 65 moves the tooth 125 out of engagement with the lug or ear 121 of the blocking member 117 to free the latter. The blocking member now moves, under the action of the spring 119, to bring the portion 122 into a position to overlie and block the lever 108 to prevent a second actuation of the setting means, as is apparent from an inspection of Fig. 6. Thus the operation of the shutter actuating or tripping means serves to lock the setting means to prevent a second operation of the latter. An arm 127 on the blocking member 117 engages the shoulder 71 to limit the rotation of the member 117 and to properly position the portion 122 thereof in the path of the lever 108.

As the blocking member 117 moves to its blocking position, Fig. 6, the ear 121 moves under the tooth 125 which is now elevated by reason of the rocking of the bellcrank 65 by the lug 82 on the trip bar 79, as described above. The tooth 125 now rests on the upper surface or face of the lug 121 which maintains the bellcrank 65 in elevated position to hold the lug 69 out of the path of the shoulder 71. Now when the lever 20 is moved to the right, by the actuation of the button 85, the tooth 125 rides along the ear 121 until the parts reach the position shown in Fig. 6, at which time, the tooth 125 then drops down behind the ear 121 and the lug 69 rests on the shoulder 71. The parts are so designed that during the leftward or locking movement of the lever 20, the tooth 125 will engage the ear 121 to rock the blocking member 117 in a counterclockwise direction to move the portion 122 out of the path of the lever 108 to free the shutter setting mechanism.

The above-described mechanism thus provides an effective arrangement by which an unintentional double exposure cannot be made. There are times, however, when the user may wish to make an intentional or deliberate double exposure. To secure this result, the present invention provides an arrangement by which the blocking member 117 may be moved, independently of the lever 20 and also independently of the winding of the film, from its blocking position shown in Fig. 6, to an inoperative or non-blocking position shown in Fig. 3. This means comprises an auxiliary member 128 mounted on a stud 129 carried by the top of the casing 11, and formed with a radially extending operating member 130 which extends to a point externally of the camera casing. When the member 130 is moved from the dotted position shown in Fig. 10 to the full-line position shown therein, a radial finger 131 on the member 128 engages the arm 127 to rock the blocking member 117 in a counterclockwise direction to move the portion 122 out of the blocking relation with the lever 108. The blocking member 117 is thus moved to the position shown in Fig. 10, and is again engaged and held by the tooth 125 of the bellcrank 65, the lever 20 not having been removed to the right to release the winding mechanism. As the setting trigger 105 is now free, it may be operated to set the shutters, and the shutter trigger 75 may be again actuated to trip the shutters a second time to make the intentional double exposure. After this second exposure, the blocking member 117 is again automatically returned to its blocking position, shown in Fig. 6, to prevent further operation until the film strip is wound, at which time the blocking member is again moved to its inoperative position, as shown in Fig. 3, as mentioned above. Thus under normal conditions, an unintentional double exposure cannot be made, but if desired, an intentional double exposure may be made; and at the end thereof, the parts automatically return to a position to prevent a subsequent inadvertent double exposure.

After the shutter is actuated, the lever 20 is withdrawn to the right to free the wind-up spool 14 so that the latter may be rotated to wind up the film. At the completion of the winding-up operation, the lever 20 moves to the left and, through the tooth 125 and the ear 121, rocks the blocking member 117 to free the setting lever 105. The parts are then in the position shown in Fig. 3. The operator may, however, inadvertently actuate the shutter trigger 75 before operating the setting lever 105 to set the shutters. Obviously, an exposure will not be made under such circumstances as the shutters are not first set or tensioned. However, such premature operation of the shutter trigger 75 will move the trip bar 79 in a clockwise direction to bring the lug 82 thereon into engagement with the lug 83 and the arm 67 of the bellcrank 65. Such engagement will rock the latter to disengage the tooth 125 thereof from the ear 121 of the blocking member 117 to free the latter so that it may move, under the action of the spring 119, to the setting lever blocking position as shown in Fig. 6. Thus, the shutter trigger 75 has been actuated and the setting lever 105 locked without the making of an exposure. Therefore, before the setting lever 105 can be released, the lever 20 must first be shifted to the right, and the inadvertently unexposed picture areas must be wound onto the take-up spool, thus causing a loss of film, the disadvantages of which are obvious.

In order to prevent such premature operation of the trigger 75 and the loss of unexposed image areas, the present invention provides an interlock between the setting trigger 105 and the tripping trigger 75 so that the latter cannot be operated until the setting shutters are properly set or tensioned. To secure this result, a double-arm lever 133 is pivoted at 134 on the camera casing 11. One end of the arm is formed with a catch 135 adapted to engage in the notch 136 formed on the end of the trip bar 79 opposite the lug 82, as best shown in Figs. 7, 8 and 9. The other end 137 of the lever 133 is adapted to cooperate with a cam 138 mounted on the shutter setting shaft 100. Fig. 7 shows the arrangement of the parts after an exposure has been made, the catch 135 being then positioned in the notch 136 to prevent clockwise rotation of the trip bar 79, and the other end 137 of the lever 133 being positioned behind the cam 138. The shutter trigger 75 is thus locked against actuation. However, when the setting trigger 105 is depressed, the setting shaft 100 is rocked or partially rotated in a counter-clockwise direction. Such movement brings the cam 138 under the end 137 of the lever 133 to move the latter to the right, as shown in Fig. 9, to pivot the lever 133 to shift the catch 135 to the left out of the notch 136, as also shown in Fig. 9, to free the trip bar 79. By means of this arrangement, the shutter actuating mechanism is positively locked against operation until the shutters have been properly set, at which time, the actuating mechanism has been unlocked so that the shutter trigger 75 may be operated to make the exposure.

The operation of the device may be briefly described as follows: After the camera is loaded, the cam 52 is first rotated to position the portion 56 in overlying relation with the slots 35 and 36 of the film measuring cam 33 to prevent the entrance of the lug 49 of the lever 28 into the slots during the winding up of the leader portion of the film strip. The actuation of the cam 52, through the portion 57 engaging the pin 58 of the cam 33, serves to set the latter to an initial position of adjustment. When the first image areas of the film strip are moved into exposing position, the slots 36 register with the lug 49, and the latter moves into the registering slot under the action of the spring 29. This serves to shift the slidable lever 20 to the left to bring the pawl 27 thereof into locking engagement with the ratchet 28 of the film winding mechanism to arrest further rotation thereof, as shown in Fig. 3. Upon such engagement, the lug 69 of the bellcrank 65 drops behind the shoulder 71 to hold the lever 20 in locking position. Simultaneously therewith, a tooth 125 on the bellcrank 65 engages a blocking member 117 to move or rock the latter out of blocking relation with the shutter setting mechanism. The shutter is then set by pressing the shutter trigger 105 which rotates the shaft 100 to set the shutters. Such a rotation of shaft 100, through a cam 138, pivots a lever 133 to move a catch 135 out of locking engagement with the shutter trip bar 79 to unlock the shutter actuating mechanism.

The shutter trigger 75 is then operated to actuate the shutters to make the two exposures, and to move the trip bar 79 in a clockwise direction to bring a lug 82 thereon into engagement with a lug 83 of the bellcrank 65 to rock the latter to release the lug 69 out of holding relation with the shoulder 71. The release of the bellcrank 65 also moves the tooth 125 thereof out of holding relation with the blocking member 117, and the latter rotates to move the portion 122 thereof into the path of the lever 108 to block the shutter setting mechanism so that it cannot be actuated. The button 85 is then pressed in to move the lever 20 to the right to disengage the winding mechanism and to also actuate the counter mechanism. An intentional double exposure can be made prior to the release of the film blocking means by actuating the auxiliary lever 128 to rotate the blocking member 117 to an inoperative position, see Fig. 3, to permit a second actuation of the shutter setting and tripping mechanism. After this intentional double exposure, the parts automatically return to a position to prevent a subsequent inadvertent double exposure.

After the last exposure is made on the film strip, the lever 20 is shifted to the right by pressing the button 85. The supply retort 15 is then rotated in any suitable and well known manner to rewind the exposed film thereinto. During this rewind operation, the pawl and ratchet 59 and 60 serve to disconnect the film measuring cam 33 from the film engaging sprocket 47 to free the latter so that it may be rotated in reverse direction during rewinding.

While one embodiment of the invention has been disclosed, it is to be understood that the inventive idea may be carried out in a number of ways. This application is, therefore, not to be limited to the precise details described but is intended to cover all variations and modifications falling within the scope of the appended claims.

I claim:

1. In a roll film camera, the combination with a camera body, a film winding mechanism including a winding spindle for moving a film strip across said body, a ratchet carried by said spindle, a rotatable control member loosely mounted on said body and formed with an open-end radial slot, film measuring means including a film engaging member, a lever movably mounted on said body and formed with a portion adapted to move into locking engagement with said ratchet, a lug carried by said lever, of means including a clutch for operatively connecting said film engaging member to said control member so that the latter will be rotated in timed relation to the movement of said strip to bring said slot into registry with said lug when a predetermined amount of film has been moved, means for moving said lug into said slot to move said lever to bring the portion thereof into locking engagement with said ratchet to arrest movement of said winding mechanism, a blocking member loosely mounted in said body adjacent said control member and having a portion movable into position to block said slot to prevent the movement of said lug thereinto during the winding of a leader portion of said strip, and means for operatively connecting said blocking member and said control member to rotate the latter to release said clutch to permit the independent movement of said control member to an initial position of adjustment.

2. In a roll film camera, the combination with a camera body, a film winding mechanism including a winding spindle for moving a film strip across said body, a ratchet carried by said spindle, a stud carried by said body, a control member rotatably mounted on said stud and formed with an open-end radial slot, film measuring means including a film engaging member, a lever movably mounted on said body and having a portion adapted to be moved into engagement with said ratchet to lock said spindle, a lug carried by said lever, of means including a one-way clutch for operatively connecting said film engaging member to said control member to rotate the latter in timed relation to the movement of said film across said body to bring said slot into registry with said lug when a predetermined amount of film has been wound, means for moving said lug into said registering slot to move said lever to bring the portion thereof into locking engagement with said ratchet to arrest movement of said winding mechanism, a blocking member loosely mounted on said stud, and means for moving said blocking member on said stud relative to said control member to position a portion of said blocking member across said slot to close the latter to prevent the movement of said lug thereinto during the winding of a leader portion of said film strip into said spindle.

3. In a roll film camera, the combination with a camera body, film winding means for moving a film strip across said body, means for automatically engaging said winding means to lock the latter against further actuation when a predetermined length of film has been wound, a shutter actuating mechanism, of a member controlled by said locking means and movable into a holding position to retain positively said locking means in locking position, means controlled by said shutter actuating mechanism for releasing said member from said holding position to permit movement of said locking means, and means for moving said locking means out of locking relation to free said winding means.

4. In a roll film camera, the combination with a camera body, film winding means for moving a film strip across said body, means for automatically engaging said winding means to lock the latter against further actuation when a predetermined length of film has been wound, a shutter actuating mechanism, of a member mounted on and movable as a unit with said locking means, stationary means on said body adapted to engage said member when said locking means engages said winding means positively to hold said locking means in engaging position, means on said shutter actuating mechanism for moving said member relative to said locking means and out of engagement with the means on said body to permit disengagement of said locking means, and means for shifting said locking means out of engagement with said winding means to free the latter.

5. In a roll film camera, the combination with a camera body, a film winding means for moving a film strip across said body, means for automatically engaging said winding means to lock the latter against further actuation when a predetermined length of film has been wound, a shutter actuating mechanism, of a holding member movably mounted on said locking means but movable as a unit therewith, a fixed shoulder formed on said body, a lug formed on said holding member and movable into engagement with said shoulder when said locking means engages said winding means to hold positively said locking means in engaging relation, means for moving said holding member to disengage said lug from said shoulder, means for retaining said lug in disengaged position to permit said locking means to be moved, and means for moving said locking means out of engaging position to free said winding means.

6. In a roll film camera, the combination with a camera body, film winding means for moving a film strip across said body, means for automatically engaging said winding means to lock the latter against further actuation when a predetermined length of film has been wound, a shutter actuating mechanism, of a holding member movably mounted on said locking means but movable as a unit therewith, a fixed shoulder formed on said body, a lug formed on said holding member and movable into engagement with said shoulder when said locking means engages said winding means to hold positively said locking means in engaging relation, means on said shutter actuating means for moving said holding member relative to said locking means to release said lug from said shoulder, means controlled by the releasing movement of said holding means to support said lug out of holding relation with said shoulder to permit said locking means to be moved, and means for shifting said locking means out of engaging relation with said winding means to free the latter.

7. In a roll film camera the combination with a camera body, film winding means for moving a film strip across said body, means for automatically engaging said winding means to lock the latter against further actuation when a predetermined length of film has been wound, a shutter actuating mechanism, a shutter setting mechanism, of pivoted blocking means mounted on said body and movable into the path of said setting mechanism to prevent the actuation thereof, means on said locking means arranged to engage and pivot said blocking means to move the latter out of said path to free said setting mechanism when said locking means engages said winding means, means for concomitantly disconnecting said blocking means from said locking means and for moving said blocking means into said path, and means to disengage said locking means to free said winding means.

8. In a roll film camera, the combination with a camera body, film winding means for moving a film strip across said body, means for automatically engaging said winding means to lock the latter against further actuation when a predetermined length of film has been wound, a shutter actuating mechanism, a shutter setting mechanism, of a member pivotally mounted on said body and formed with a portion arranged to be positioned in the path of said setting mechanism to prevent the movement thereof, means of said locking means arranged to engage said member to pivot the latter to move said portion out of said path to free said setting mechanism when said locking means engages said winding means, means for disconnecting said member from said locking means, means to move said disconnected member to position said portion in said path, and means for disengaging said locking means from said winding means.

9. In a roll film camera, the combination with a camera body, film winding means for moving a film strip across said body, means for automatically engaging said winding means to lock the latter against further actuation when a predetermined length of film has been wound, a shutter actuating mechanism, a shutter setting mechanism, of a shoulder formed on said body, holding means on said locking means movable into engagement with said shoulder when said locking means engages said winding means to hold said locking means in engaged position, a blocking member mounted on said body and movable into the path of said setting mechanism to prevent the operation thereof, means on said locking means arranged to engage said blocking means to move the latter out of said path to free said setting mechanism upon the locking of said winding means, means for concomitantly disconnecting said holding means from said shoulder and for disconnecting said blocking means from said locking means, means for moving said disconnected blocking means into said path, and means for disengaging said locking means from said winding means to free the latter.

10. In a roll film camera, the combination with a camera body, film winding means for moving a film strip across said body, means for automatically engaging said winding means to lock the latter against further actuation when a predetermined length of film has been wound, a shutter actuating mechanism, a shutter setting mechanism, of a shoulder formed on said body, holding means on said locking means movable into engagement with said shoulder when said locking means engages said winding means to hold said locking means in engaged position, a blocking member mounted on said body and movable into the path of said setting mechanism to prevent the operation thereof, means on said locking means arranged to engage said blocking means to move the latter out of said path to free said setting mechanism upon the locking of said winding means, means for concomitantly disconnecting said holding means from said shoulder and for disconnecting said blocking means from said locking means, means for moving said disconnected blocking means into said path, means on said disconnected blocking means for retaining said holding means out of engagement with said shoulder, and means for disengaging said locking means from said winding means to free the latter.

11. In a roll film camera, the combination with a camera body, film winding means for moving a film strip across said body, means for automatically engaging said winding means to lock the latter against further actuation when a predetermined length of film has been wound, a shutter actuating mechanism, a shutter setting mechanism, of a shoulder formed on said body, a member pivotally mounted on said locking means and movable as a unit therewith, a lug on said pivoted member movable into holding relation with said shoulder when said locking means engages said winding means to hold positively said locking means in engaging relation, a blocking member rockably mounted on said body and formed with a portion adapted to be moved into the path of said setting mechanism to prevent the actuation thereof, an ear on said blocking member, a tooth member on said pivoted member movable into engagement with said ear when said locking means engages said winding means to rock said blocking member to move said portion out of said path, means for moving said pivoted member relative to said locking means to concomitantly disengage said lug from said shoulder and to move said tooth away from ear to free said blocking member, means for rocking said blocking member to move said portion into said path and to move said ear under said tooth to support said pivoted member to retain said lug out of holding relation with said shoulder to permit said locking means to be moved, and means for moving said locking means out of engagement with said winding means to free the latter.

12. In a roll film camera, the combination with a camera body, film winding means for moving a film strip across said body, means for automatically engaging said winding means to lock the latter against further actuation when a predetermined length of film has been wound, a shutter actuating mechanism, a shutter setting mechanism, of blocking means mounted on said body and adapted to move into the path of said setting mechanism to prevent the actuation thereof, means on said locking means arranged to engage and move said blocking means out of said path to free said setting mechanism when said locking means engages said winding means, means for concomitantly disconnecting said blocking means from said locking means and for moving said blocking means into said path upon operation of said shutter actuating mechanism, means independent of said locking means for moving said blocking means out of said path to permit a second actuation of said setting mechanism prior to the release of said locking means from said winding means to afford a deliberate double exposure of said film, and means for releasing said locking means from said winding means to free the latter.

13. In a roll film camera, the combination with a camera body, film winding means for moving a film strip across said body, means for automatically engaging said winding means to lock the latter against further actuation when a predetermined length of film has been wound, a shutter actuating mechanism, a shutter setting mechanism, of a shoulder formed on said body, a member pivotally mounted on said locking means and movable as a unit therewith, a lug on said pivoted member movable into holding relation with said shoulder when said locking means engages said winding means to hold positively said locking means in engaging relation, a blocking member rockably mounted on said body and formed with a portion adapted to be moved into the path of said setting mechanism to prevent the actuation thereof, an ear on said blocking member, a tooth member on said pivoted member movable into engagement with said ear when said locking means is moved into locking relation with said winding means to rock said blocking member to move said portion out of said path, means on said shutter actuating mechanism and operative upon actuation of the latter to make an exposure for moving said pivoted member relative to said locking means to concomitantly disengage said lug from said shoulder and to move said tooth away from said ear to free said blocking member, means for rocking said blocking member to move said portion into said path and to move said ear under said tooth to support said pivoted member to retain said lug out of holding relation with said shoulder, means independent of said tooth for again rocking said blocking member to move said portion out of said path to permit a second actuation of said shutter setting and actuating means to permit a second exposure prior to the release of said locking means from said winding means, the second actuation of said shutter actuating mechanism serving to again bring the means on the latter mechanism into operation to again move said pivoted member to disengage said lug from said shoulder and to free said blocking member to permit the latter to again rock to move into said path and to support said tooth, and means for then moving said locking means from said winding means.

14. In a roll film camera, the combination with a camera body, of film winding means for moving a film strip across said body, film measuring means including a film engaging member actuated by and in timed relation with the movement of said film across said body, a shutter actuating mechanism, a shutter setting mechanism, a blocking member movably mounted on said body and adapted to be positioned in the path of said setting mechanism to prevent the operation thereof, means controlled by said film engaging member for moving said blocking member out of said path when said film is moved across said body to permit the operation of said setting mechanism, a locking latch carried by said body and arranged to be moved into locking engagement with said shutter actuating mechanism to prevent the operation of the latter, means operatively connected to and controlled by the operation of said setting mechanism for moving said latch out of locking engagement with said shutter actuating mechanism to release the latter so that it may be operated to expose said film, means controlled by the operation of said shutter actuating mechanism for disconnecting said blocking member from said film engaging member, and means for then moving said blocking member into the path of said setting mechanism to prevent the operation thereof.

15. In a roll film camera, the combination with a camera body, of film winding means for moving a film strip across said body, film measuring means including a film engaging member actuated by and in timed relation with the movement of said film across said body, a shutter actuating mechanism, a shutter setting mechanism, a shutter setting lever operatively connected to said setting mechanism to actuate the latter, a blocking member movably mounted on said body and adapted to be positioned in the path of said setting lever to prevent the actuation of said setting mechanism, means controlled by said film engaging member for moving said blocking member out of said path when said film is moved across said body to permit the movement of said lever to actuate said setting mechanism to set said shutter, a locking latch pivotally mounted on said body and having a portion arranged to be moved into locking engagement with said shutter actuating mechanism to prevent the operation of the latter, a cam on said setting mechanism, the operation of said lever serving to move said cam into engagement with said latch to move the latter out of locking engagement with said shutter actuating mechanism to free the latter so that it may be operated to make an exposure, means controlled by the operation of said shutter actuating mechanism for disconnecting said blocking member from said film engaging member, means for moving the disengaged blocking member into the path of said lever to prevent the actuation thereof, and means for moving said latch into engagement with said shutter actuating mechanism to hold the latter against movement.

16. In a roll film camera, the combination with a camera body, of film winding means for moving a film strip across said body, means for automatically locking said winding means when a predetermined length of film has been wound, film measuring means including a film engaging member actuated by the movement of said film strip across said body, a control member for controlling said locking means, means for releasably connecting said control member to said measuring means so as normally to be actuated thereby, a shutter actuating mechanism, a member controlled by said locking means and movable into a holding position to retain positively said locking means in locking position, means controlled by said shutter actuating mechanism for releasing said member from said holding position to permit movement of said locking means, and means for moving said locking means out of locking relation to free said winding means.

17. In a roll film camera, the combination with a camera body, of film winding means for moving a film strip across said body, means for automatically locking said winding means when a predetermined length of film has been wound, film measuring means including a film engaging member actuated by the movement of said film strip across said body, a control member for controlling said locking means, means for releasably connecting said control member to said measuring means so as normally to be actuated thereby, a shutter actuating mechanism, a member controlled by said locking means and movable into a holding position to retain positively said locking means in locking position, means controlled by said shutter actuating mechanism for releasing said member from said holding position to permit movement of said locking means, means for moving said locking means out of locking relation to free said winding means, and means for disconnecting said control member from and moving it relative to said measuring means to a predetermined control position of adjustment.

18. In a roll film camera, the combination with a camera body, of film winding means for moving a film strip across said body, means for automatically locking said winding means when a predetermined length of film has been wound, film measuring means including a film engaging member actuated by the movement of said film strip across said body, a control member for controlling said locking means, means for releasably connecting said control member to said measuring means so as normally to be actuated thereby, a shutter actuating mechanism, a shutter setting mechanism, a blocking means mounted on said body and movable into the path of said setting mechanism to prevent the actuation thereof, means on said locking means arranged to engage and move said blocking means out of said path to free said setting mechanism when said locking means engages said winding means, means for concomitantly disconnecting said blocking means from said locking means and for moving said blocking means into said path, and means to disengage said locking means to free said winding means.

19. In a roll film camera, the combination with a camera body, of film winding means for moving a film strip across said body, means for automatically locking said winding means when a predetermined length of film has been wound, film measuring means including a film engaging member actuated by the movement of said film strip across said body, a control member for controlling said locking means, means for releasably connecting said control member to said measuring means so as normally to be actuated thereby, a shutter actuating mechanism, a shutter setting mechanism, a blocking means mounted on said body and movable into the path of said setting mechanism to prevent the actuation thereof, means on said locking means arranged to engage and move said blocking means out of said path to free said setting mechanism when said locking means engages said winding means, means for concomitantly disconnecting said blocking means from said locking means and for moving said blocking means into said path, means to disengage said locking means to free said winding means, and means for disconnecting said control member from and moving it relative to said measuring means to a predetermined position of adjustment.

20. In a roll film camera, the combination with a camera body, of film winding means for moving a film strip across said body, means for automatically locking said winding means when a predetermined length of film has been wound, film measuring means including a film engaging member actuated by the movement of said film strip across said body, a control member for controlling said locking means, means for releasably connecting said control member to said measuring means so as normally to be actuated thereby, a shutter actuating mechanism, a shutter setting mechanism, a member controlled by said locking means and movable into a holding position to retain positively said locking means in locking position, means controlled by said shutter actuating mechanism for releasing said member from said holding position to permit movement of said locking means, means for moving said locking means out of locking relation to free said winding means, means for disconnecting said control member from and moving it relative to said measuring means to a predetermined control position of adjustment, a blocking means mounted on said body and movable into the path of said setting mechanism to prevent the actuation thereof, means on said locking means arranged to engage and move said blocking means out of said path to free said setting mechanism when said locking means engages said winding means, means for concomitantly disconnecting said blocking means from said locking means and for moving said blocking means into said path, and means to disengage said locking means to free said winding means.

DAVID L. BABCOCK.